(12) United States Patent
Kim

(10) Patent No.: US 11,809,211 B1
(45) Date of Patent: Nov. 7, 2023

(54) FOLDABLE PEDAL APPARATUS FOR VEHICLE

(71) Applicants: Hyundai Motor Company, Seoul (KR); Kia Corporation, Seoul (KR)

(72) Inventor: Eun Sik Kim, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/981,224

(22) Filed: Nov. 4, 2022

(30) Foreign Application Priority Data

Jun. 27, 2022 (KR) .......................... 10-2022-0078298

(51) Int. Cl.
| | | |
|---|---|---|
| G05G 1/30 | (2008.04) | |
| G05G 1/40 | (2008.04) | |
| B60K 26/02 | (2006.01) | |
| G05G 1/44 | (2008.04) | |
| B60T 7/06 | (2006.01) | |
| G05G 1/36 | (2008.04) | |

(52) U.S. Cl.
CPC .............. *G05G 1/40* (2013.01); *B60K 26/02* (2013.01); *G05G 1/44* (2013.01); *B60K 2026/026* (2013.01); *B60T 7/06* (2013.01); *G05G 1/36* (2013.01)

(58) Field of Classification Search
CPC .. G05G 1/30; G05G 1/32; G05G 1/36; G05G 1/38; G05G 1/40; G05G 1/405; G05G 1/44; G05G 1/445; G05G 5/005; G05G 5/03; G05G 5/05; G05G 5/28; B60K 26/02; B60K 26/021; B60K 2026/026; B60K 2026/023; B60K 2026/022; B60T 7/04; B60T 7/06; B60T 7/065; B60R 21/09
See application file for complete search history.

(56) References Cited

U.S. PATENT DOCUMENTS

| | | | | |
|---|---|---|---|---|
| 3,097,542 | A | * 7/1963 | Chayne | ..................... B60T 7/06 |
| | | | | 180/90.6 |
| 10,946,741 | B1 * | 3/2021 | Kim | ........................... B60T 7/06 |
| 11,312,236 | B1 * | 4/2022 | Kim | ........................ B60T 7/065 |
| 11,429,132 | B1 * | 8/2022 | Yasuda | ................ B60K 26/021 |
| 11,458,838 | B1 * | 10/2022 | Kim | ........................... B60T 7/06 |
| 11,465,498 | B1 * | 10/2022 | Kim | ........................... B60T 7/06 |

(Continued)

FOREIGN PATENT DOCUMENTS

| | | | |
|---|---|---|---|
| CN | 111216698 A | * 6/2020 | |
| DE | 102019202888 A1 | * 9/2020 | ............... G05G 1/40 |

(Continued)

OTHER PUBLICATIONS

Machine Translation of DE-102019210675-A1.*

(Continued)

*Primary Examiner* — Richard W Ridley
*Assistant Examiner* — Brian J McGovern
(74) *Attorney, Agent, or Firm* — MORGAN, LEWIS & BOCKIUS LLP

(57) ABSTRACT

A foldable pedal apparatus of a vehicle includes a pendant-type configuration provided with a pedal arm and a pedal pad. The pedal pad rotates with respect to the pedal arm when the rotation motor operates so that the pedal pad pops up to protrude toward a driver or hide to block the exposure to the driver.

13 Claims, 10 Drawing Sheets

(56) References Cited

U.S. PATENT DOCUMENTS

| | | | | |
|---|---|---|---|---|
| 2008/0084110 A1* | 4/2008 | Suzuki | ................... | B60T 7/042 |
| | | | | 701/41 |
| 2010/0107805 A1* | 5/2010 | Bryce | .................... | B60T 7/042 |
| | | | | 74/519 |
| 2014/0298949 A1* | 10/2014 | Brown | .................... | G05G 1/40 |
| | | | | 74/513 |
| 2017/0341648 A1* | 11/2017 | Sanma | ................. | B60W 50/16 |
| 2021/0318710 A1* | 10/2021 | Miletto | ................. | B60K 26/02 |
| 2021/0331584 A1* | 10/2021 | Kim | ........................ | G05G 1/40 |

FOREIGN PATENT DOCUMENTS

| | | | | |
|---|---|---|---|---|
| DE | 10-2019-202888 B4 | 10/2020 | | |
| DE | 102019210675 A1 * | 1/2021 | | |
| FR | 3037160 A1 * | 12/2016 | | |
| KR | 10-2017-0137427 | 12/2017 | | |
| WO | WO-2016055198 A1 * | 4/2016 | ............. | B60K 26/00 |
| WO | WO-2016055202 A1 * | 4/2016 | ........... | B60K 26/021 |

OTHER PUBLICATIONS

Machine Translation of CN-111216698-A.*
Machine Translation of WO-2016055198-A1.*
Machine Translation of DE-102019202888-A1.*
Machine Translation of WO-2016055202-A1.*
Machine Translation of FR-3037160-A1.*

* cited by examiner

FOLDABLE PEDAL APPARATUS FOR VEHICLE

CROSS REFERENCE TO RELATED APPLICATION

The present application claims priority to Korean Patent Application No. 10-2022-0078298, filed Jun. 27, 2022, the entire contents of which is incorporated herein for all purposes by this reference.

BACKGROUND OF THE PRESENT DISCLOSURE

Field of the Present Disclosure

The present disclosure relates to a foldable pedal apparatus for a vehicle, and more particularly, to technology for a foldable pedal apparatus for a vehicle with a pendant-type configuration, in which a pedal pad rotates with respect to a pedal arm to pop up protruding toward a driver or to hide blocking exposure toward the driver.

DESCRIPTION OF RELATED ART

An autonomous driving vehicle is a smart vehicle adopting autonomous driving technology that allows the vehicle to reach a destination on its own without active manipulations of the steering wheel, accelerator pedal, and brake by a driver and has been rapidly developed recently.

When autonomous driving is universally implemented, a manual driving mode in which the driver is actively involved in driving or an autonomous driving mode in which the vehicle travels to a destination on its own without active involvement in driving by the driver may be selected.

Because the driver needs to rest comfortably with his feet stretched in the autonomous driving mode, a disadvantage is that pedals (accelerator pedal, brake pedal) positioned in a space below the driver's seat interfere with the driver's rest if exposed to the interior in the space below the driver's seat.

Furthermore, if the driver manipulates the pedals (accelerator pedal, brake pedal) of the vehicle in an autonomous driving mode where the driver is not to manipulate the pedals, the vehicle control apparatus determines that the driver wants to terminate the autonomous driving and be actively involved in driving and terminates the control for autonomous driving.

However, because the vehicle pedals are provided to be exposed in the space below the driver's seat, there is a concern that the driver may unconsciously manipulate the pedals in the autonomous driving mode (a case of a faulty pedal manipulation). In such a case, there is a risk of accident depending on the situation on the road, the length between vehicles, or the like.

Accordingly, there is a demand for technological development for a pedal apparatus in which the pedal pad protrudes to be exposed toward a driver so that the driver may manipulate the pedal pad in the manual driving mode in which the driver is actively involved in driving, and in which exposure of the pedal pad is blocked so that the driver may not manipulate the pedal pad in the autonomous driving mode for the comforting rest of the driver and safety like prevention of a faulty manipulation.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a foldable pedal apparatus with a pendant-type configuration in which a pedal pad rotates with respect to a pedal arm and pops up or hides so that the pedal pad rotates to protrude toward a driver and is exposed (pops up) in the manual driving mode in which the driver is actively involved in driving, and the pedal pad rotates forward to hide and block exposure to the driver (hide) in the autonomous driving mode, allowing comfortable rest of the driver in the autonomous driving mode and further improving safety by blocking a faulty manipulation of the pedal in the autonomous driving mode.

Various aspects of the present disclosure are directed to providing a foldable pedal apparatus minimizing the length from a hinge portion of the pedal arm to the end portion of the pedal pad when the pedal pad is in a hide state, reducing an overall size of the pedal apparatus and ensuring sufficient free space when the pedal pad is in the hide state.

According to various exemplary embodiments of the present disclosure for achieving the objects described above, the foldable pedal apparatus for a vehicle includes a pedal housing, a pedal arm, a first end portion of which is rotatably coupled to the pedal housing to rotate forwards and backwards thereof, and a pedal pad rotatably coupled to a second end portion of the pedal arm, wherein the pedal pad turns into a pop-up state in which a driver may manipulate the pedal pad in the manual driving mode as the pedal pad rotates backward and downward with respect to the pedal arm and extends in the longitudinal direction of the pedal arm to be exposed toward the driver.

The pedal pad turns into the hide state in which the driver may not manipulate the pedal pad in the autonomous driving mode as the pedal pad rotates forward and upward with respect to the pedal arm, wraps around a portion of the pedal arm, and hides from the driver.

The pedal pad hides from the driver in the hide state as the length from a hinge portion of the pedal arm to the end portion of the pedal pad decreases when the pedal pad shifts from the pop-up state to the hide state.

A rotation motor fixed to the second end portion of the pedal arm and configured to rotate the pedal pad clockwise or counterclockwise during operation thereof, the motor shaft being coupled to the pedal pad, is further included.

The pedal pad is provided with a stopper protrusion, and the full stroke position of the pedal arm is restrained as the stopper protrusion comes into contact with the dash panel when the pedal arm rotates forward by the manipulation of the driver while the pedal pad in the pop-up state.

The pedal pad is provided with a stopper protrusion, the stopper protrusion faces the pedal housing when the pedal pad is in the hide state, and the contact of the stopper protrusion with the pedal housing stops the pedal arm from rotating forward when the pedal arm is subjected to a force to rotate forward while the pedal pad is in the hide state.

The pedal pad is provided with an operating space into which the end portion of the pedal arm is inserted to be coupled to the pedal pad, and a first side surface and upper and lower surfaces of an external peripheral surface of the pedal pad are connected to the operating space in an open structure and a second side surface is formed with a blocked portion to be disconnected from the operating space.

When an internal wall surface of the blocked portion comes into contact with a side surface of the pedal arm while the pedal pad rotates, the pedal pad stops rotating and turns into the pop-up state or the hide state.

The pedal arm includes a straight portion protruding from the pedal housing, and the pedal pad wraps around a portion in the second end portion of the pedal arm as the straight portion of the pedal arm is inserted into the operating space of the pedal pad when the pedal pad is in the hide state.

The blocked portion is provided to face the vehicle door when the pedal pad is in the pop-up state.

The pedal housing is fixed on the dash panel in the lower space of the driver's seat in a pendant type.

Two pedal assemblies including a pedal housing, a pedal arm, and a pedal pad are provided right and left to be spaced from each other on the dash panel in a lower space of the driver's seat. of the two assemblies, a first one is used as an accelerator pedal device and a second one is used as a brake pedal device.

According to an exemplary embodiment of the present disclosure, the foldable pedal apparatus has a pendant-type configuration provided with a pedal arm and a pedal pad, and the pedal pad pops up to protrude toward the driver or hide to block exposure toward the driver as the pedal pad rotates with respect to the pedal arm, allowing comfortable rest of the driver in the autonomous driving mode and further improving safety by blocking a faulty manipulation of a pedal in the autonomous driving mode.

Furthermore, according to an exemplary embodiment of the present disclosure, the foldable pedal apparatus minimizes the length between the hinge portion of the pedal arm and the end portion of the pedal pad when the pedal pad is in the hide state, reducing an overall size of the pedal apparatus and ensuring sufficient free space when the pedal pad is in the hide state.

Furthermore, according to an exemplary embodiment of the present disclosure, the foldable pedal apparatus has a pendant-type configuration in which the pedal housing is suspended from the dash panel in the lower space of the driver's seat so that the foldable pedal apparatus may be provided and operated without forming a hole in the dash panel, stopping the noise and foreign objects from entering the passenger compartment and preventing moisture leak as much as possible.

Furthermore, according to an exemplary embodiment of the present disclosure, the rotation motor rotates the pedal pad only to implement the foldable pedal apparatus so that a low-capacity motor may be used, allowing cost cut and weight reduction.

Furthermore, according to an exemplary embodiment of the present disclosure, the contact of the stopper protrusion with the pedal housing stops the pedal arm from rotating even when the driver manipulates the pedal pad while the pedal pad is in the hide state, preventing an accident resulting from a faulty operation of the pedal arm by effectively blocking the forward rotation of the pedal arm when the pedal pad is in the hide state.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
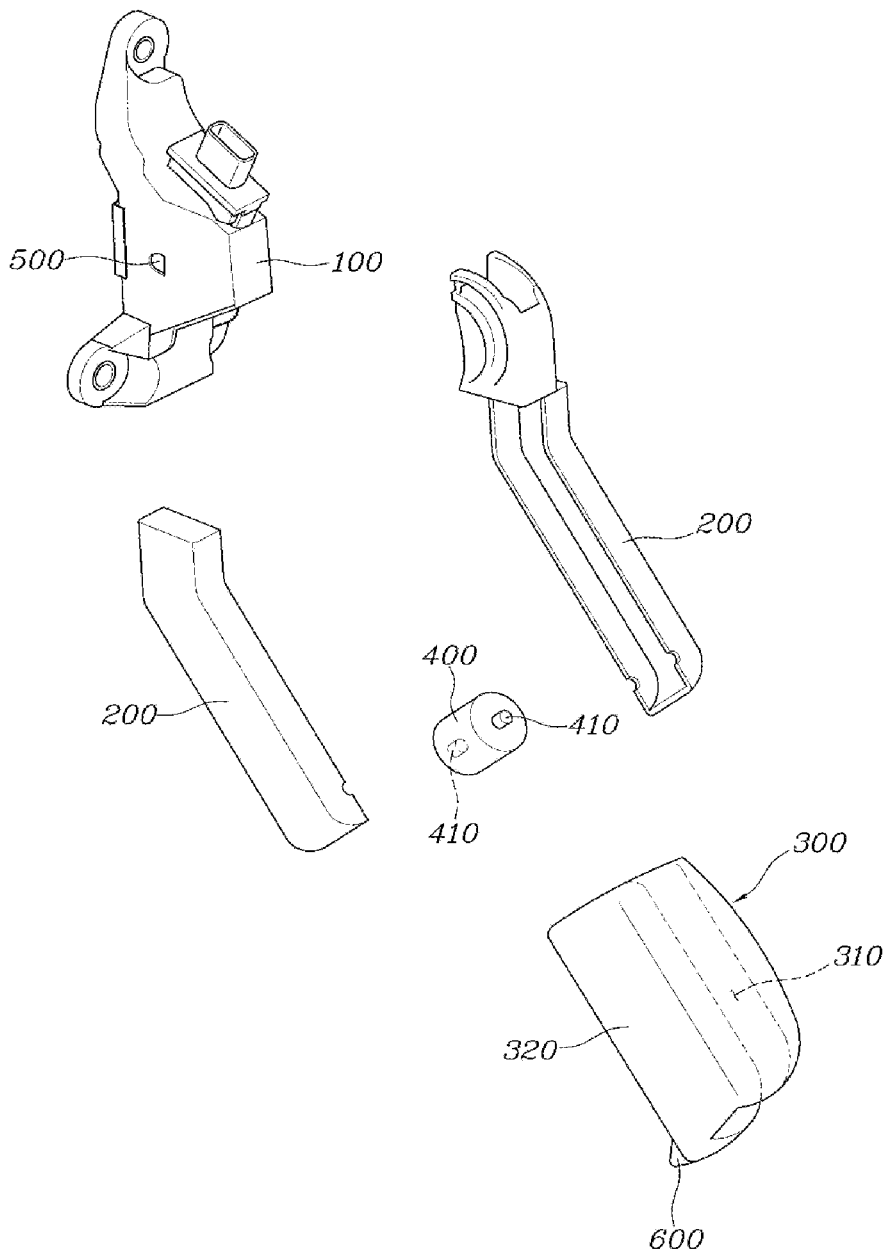
FIG. 1 is a view exemplarily illustrating disassembled foldable pedal apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Embodiments of the present specification will be described with reference to the accompanying drawings in the following. The same or similar components will be provided the same reference numerals regardless of the drawing numbers and repetitive descriptions of these components will be omitted.

The suffixes "module" and "unit" for the components used in the following description are provided or interchangeably used only in consideration of the ease of writing the specification and do not have meanings or roles distinct from each other by themselves.

When it is determined that the specific description of the related and already known technology may obscure the gist of the embodiments included in the specification In describing the embodiments included in the present specification, the specific description will be omitted.

Furthermore, it is to be understood that the accompanying drawings are for a better understanding of the exemplary embodiment included in the present specification and that the technical ideas included in the present specification are not limited by the accompanying drawings and include all the modifications, equivalents, or substitutes included in the spirit and technical scope of the present disclosure.

Terms including ordinal numbers such as first, second, and the like may be used to describe various components, but the components are not to be limited by the terms. The terms may only be used for distinguishing one component from another.

It is to be understood that when a component is referred to as being "connected" or "coupled" to another component, the component may be directly connected or coupled to the another component, but other components may exist in between.

In contrast, when a component is referred to as being "directly connected" or "directly coupled" to another component, it is to be understood that there are no intervening components present.

Singular expressions include plural expressions unless the context explicitly indicated otherwise.

In the present specification, terms such as "comprise" or "have" are intended to designate the presence of implemented features, numbers, steps, operations, components, parts, or combinations thereof and are not to be understood to preclude the presence or additional possibilities of one or more of other features, numbers, steps, operations, components, parts or combinations thereof in advance.

Furthermore, the unit or control unit included in the name such as a motor control unit MCU is a term widely used in naming a controller that controls a specific function of a vehicle and does not refer to a generic function unit.

The controller may include a communication device communicating with other controllers or sensors for controlling the functions of which the controller is in charge, a memory storing an operating system, or logic commands and input/output information, and one or more processors executing judgment, calculation, determination, etc. required for controlling the functions.

A foldable pedal apparatus of a vehicle according to exemplary embodiments of the present disclosure will be described with reference to the accompanying drawings in the following.

The pedal apparatus of a vehicle is classified into a pendant type suspended from a dash panel and an organ type provided on a floor panel.

The pendant type includes a pedal arm and a pedal pad and the rotation center portion of the pedal arm is on the upper side so that the driver steps on or pushes forward the pedal pad for manipulation, while the organ type has the rotation center portion on the lower side so that the driver rotates the upper portion of the pedal pad forward for manipulation.

According to an exemplary embodiment of the present disclosure, the pedal housing of the foldable pedal apparatus is fixed on a dash panel in the lower space of the driver's seat in a pendant type.

That is, according to an exemplary embodiment of the present disclosure, as illustrated in FIGS. 1 to 10, the foldable pedal apparatus of a vehicle includes a pedal housing 100, a pedal arm 200 coupled to the pedal housing 100 to rotate forwards and backwards thereof, a pedal pad 300 rotatably coupled to an end portion of the pedal arm 200, and a rotation motor 400 fixed to the end portion of the pedal arm 200 and configured to rotate the pedal pad 300 clockwise or counterclockwise during operation thereof, and a motor shaft 410 is coupled to the pedal pad 300.

According to an exemplary embodiment of the present disclosure, the pedal apparatus is a pendant-type apparatus in which the pedal housing 100 is fixed on a dash panel 10 in the lower space of the driver's seat and an upper portion of the pedal arm 200 is rotatably coupled to the pedal housing 100 by a hinge portion 500.

The rotation motor 400 is fixed in a lower portion of the pedal arm 200, the lower portion of the pedal arm 200 and the rotation motor 400 are inserted into the pedal pad 300, and the motor shaft 410 of the rotation motor 400 is coupled to the pedal pad 300.

Accordingly, when the rotation motor 400 operates to rotate the motor shaft 410, the pedal pad 300 coupled to the motor shaft 410 rotates with respect to the pedal arm 200.

The pedal arm 200 may be separately provided as right and left portions to facilitate assembly with the pedal housing 100 and the rotation motor 400.

The pedal pad 300 is a part manipulated by the driver stepping thereon, and the lower end portion of the pedal arm 200, including the pedal pad 300, rotates forward around the hinge portion 500 when the driver manipulates the pedal pad 300.

The rotation motor 400 may rotate both clockwise and counterclockwise, and a biaxial motor with two motor shafts 410 protruding in either direction is used.

Coupling the two motor shafts 410 to the pedal pad 300 allows more stable and accurate transmission of the rotation force to the pedal pad 300.

When the pedal pad 300 rotates backward and downward with respect to the pedal arm 200 by operation of the rotation motor 400, the pedal pad 300 extends in the longitudinal direction of the pedal arm 200 to be exposed toward the driver and accordingly turns into the pop-up state in which the driver may manipulate the pedal pad 300 in the manual driving mode (refer to FIG. 2, FIG. 3, FIG. 4 and FIG. 5).

Figure 7:
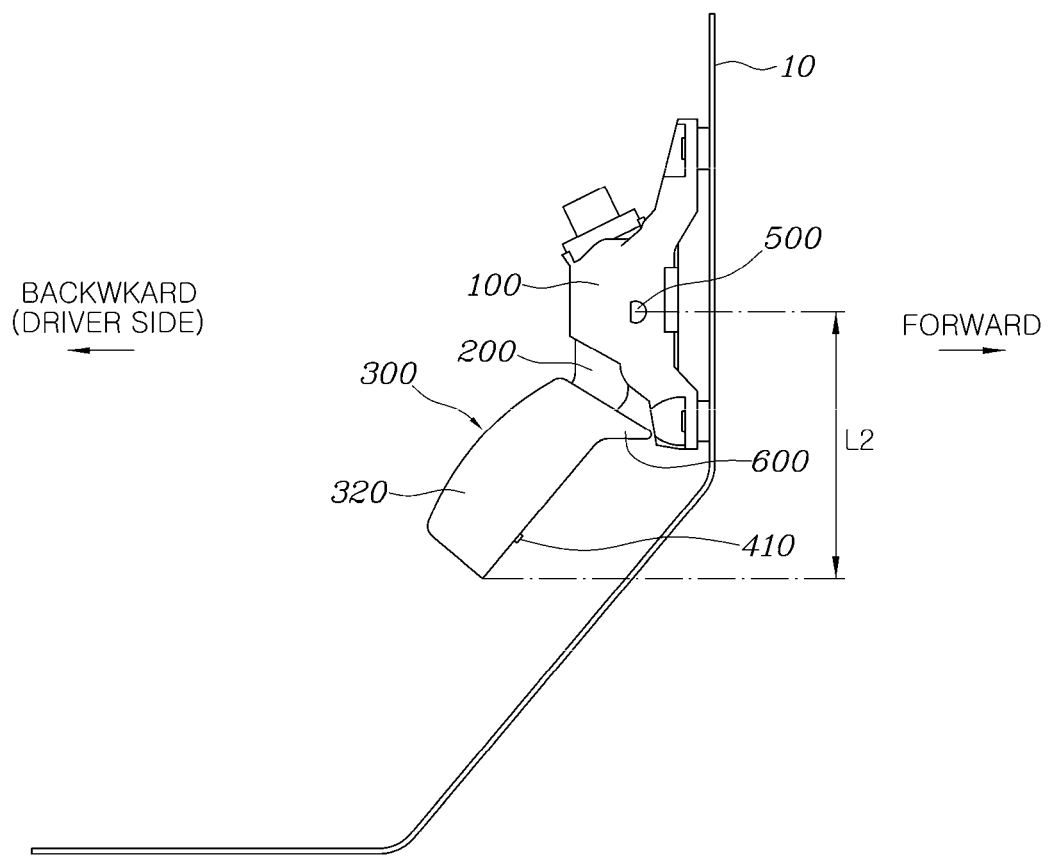
FIG. 7 is a view exemplarily illustrating a pedal pad in a hide state by the rotation of the pedal pad in FIG. 2.
Figure 8:
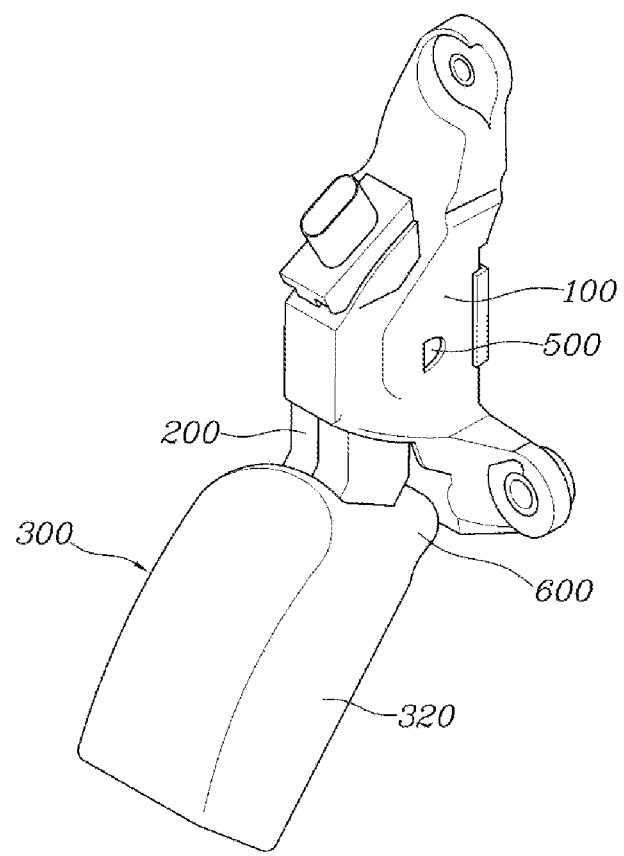
FIG. 8 is a view exemplarily illustrating a foldable pedal apparatus in a hide state.
Figure 9:
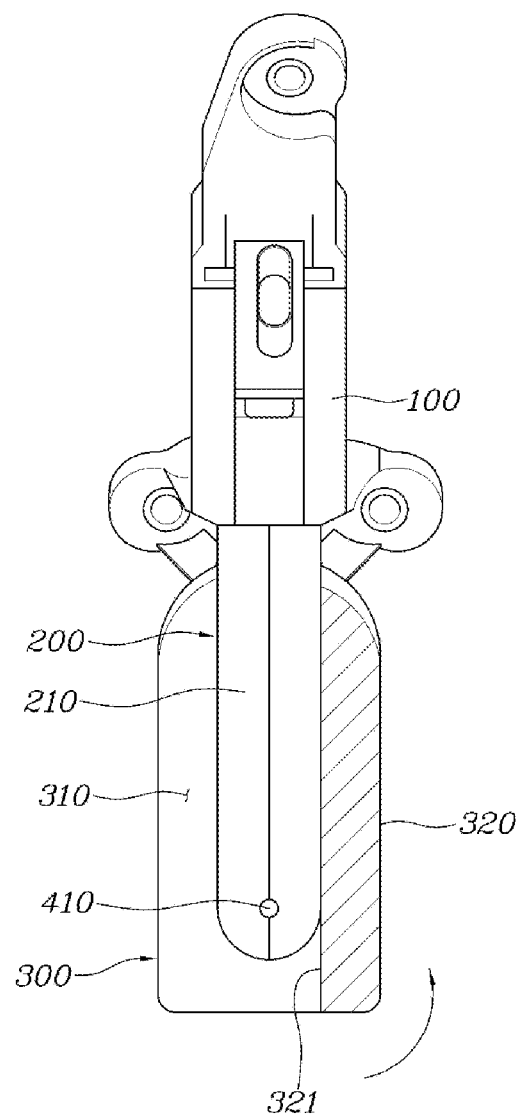
FIG. 9 is a front view exemplarily illustrating the inside of the pedal pad in FIG. 8.

When the pedal pad 300 rotates forward and upward with respect to the pedal arm 200 by operation of the rotation motor 400, the pedal pad 300 wraps around a part of the pedal arm 200 to hide from the driver and accordingly turns into the hide state in which the driver may not manipulate the pedal pad 300 in the autonomous driving mode (refer to FIGS. 7 to 9).

The length between the hinge portion 500 of the pedal arm 200 and the end portion of the pedal pad 300 is L1 (refer to FIG. 2) when the pedal pad 300 is in the pop-up state, and the length between the hinge portion 500 of the pedal 200 and the end portion of the pedal pad 300 is L2 (refer to FIG. 7) when the pedal pad 300 is in the hide state.

The pedal pad 300 protrudes to extend in the longitudinal direction of the pedal arm 200 when the pedal pad 300 is in the pop-up state so that the length L1 in the pop-up state is longer than the length L2 in the hide state, and accordingly the pedal pad 300 is exposed toward the driver in the pop-up state.

The pedal pad 300 rotates forward and upward and wraps around a portion of the pedal arm 200 when the pedal pad 300 is in the hide state so that the length L2 in the hide state decreases relative to the length L1 in the pop-up state and the pedal pad 300 hides from the driver in the hide state accordingly.

According to an exemplary embodiment of the present disclosure, the pedal pad 300 is provided with protruding stopper protrusion 600.

The stopper protrusion 600 may be integrally formed in the pedal pad 300 or be formed separately to be fixedly coupled to the pedal pad 300 and protrudes toward the dash panel 10.

Figure 2:
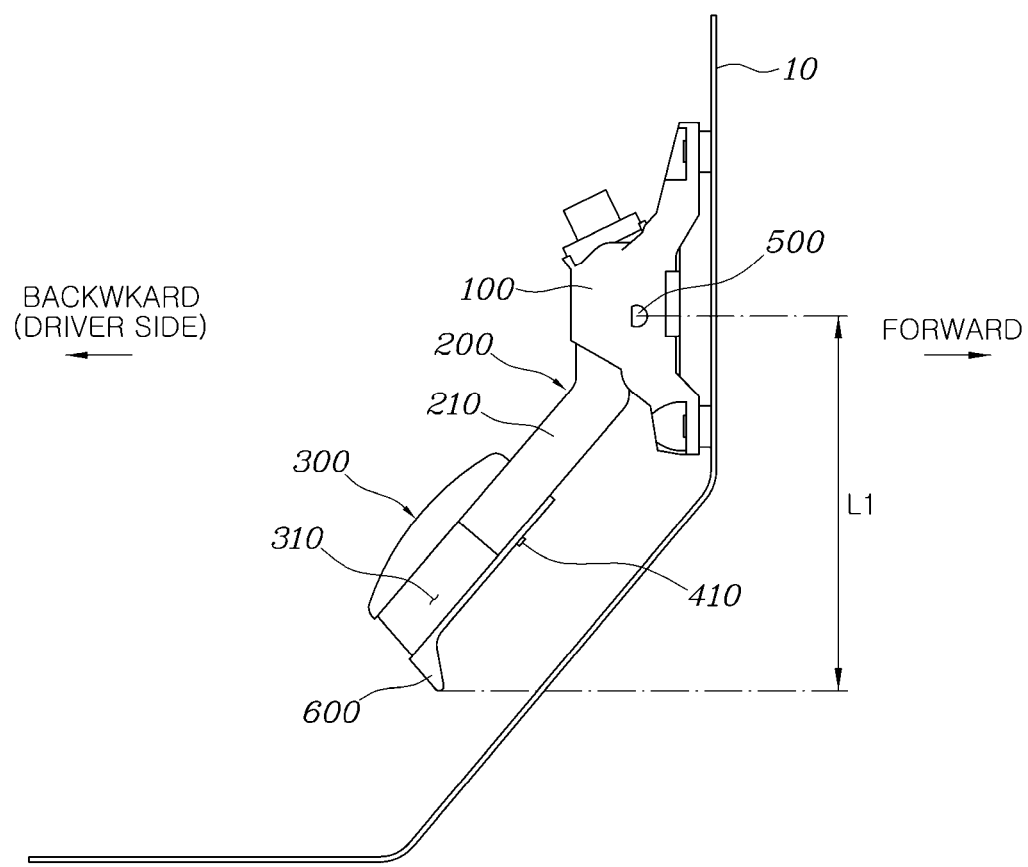
FIG. 2 is a view exemplarily illustrating a foldable pedal apparatus provided on a dash panel when the pedal pad is in a pop-up state according to an exemplary embodiment of the present disclosure.
Figure 3:
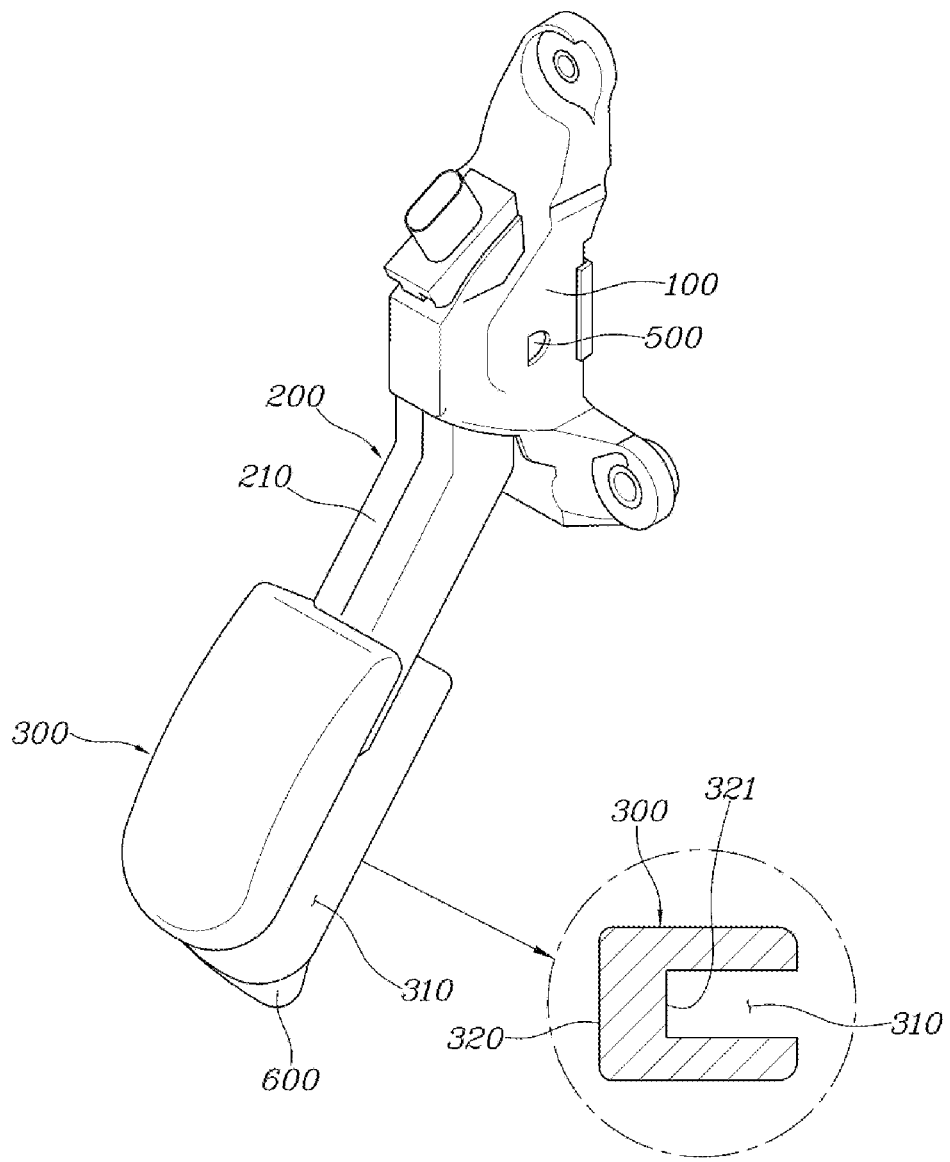
FIG. 3 and FIG. 4 are views exemplarily illustrating a foldable pedal apparatus in a pop-up state.
Figure 4:
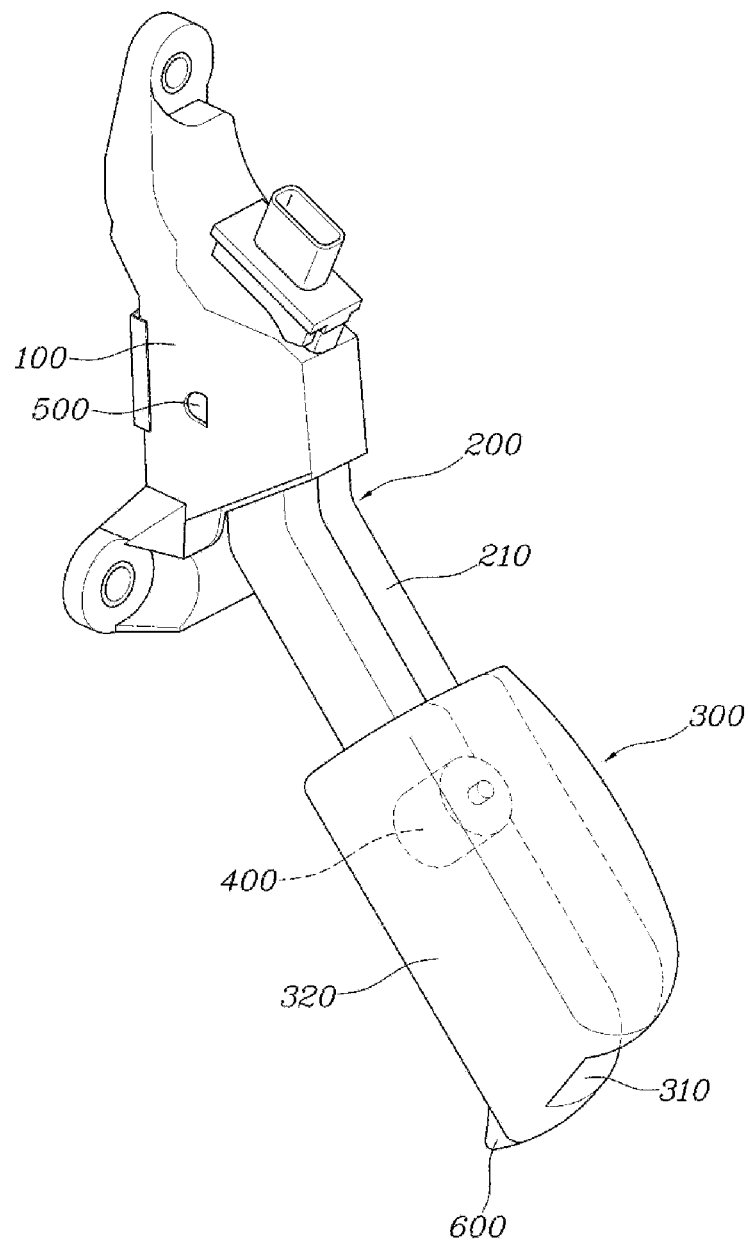
Figure 6:
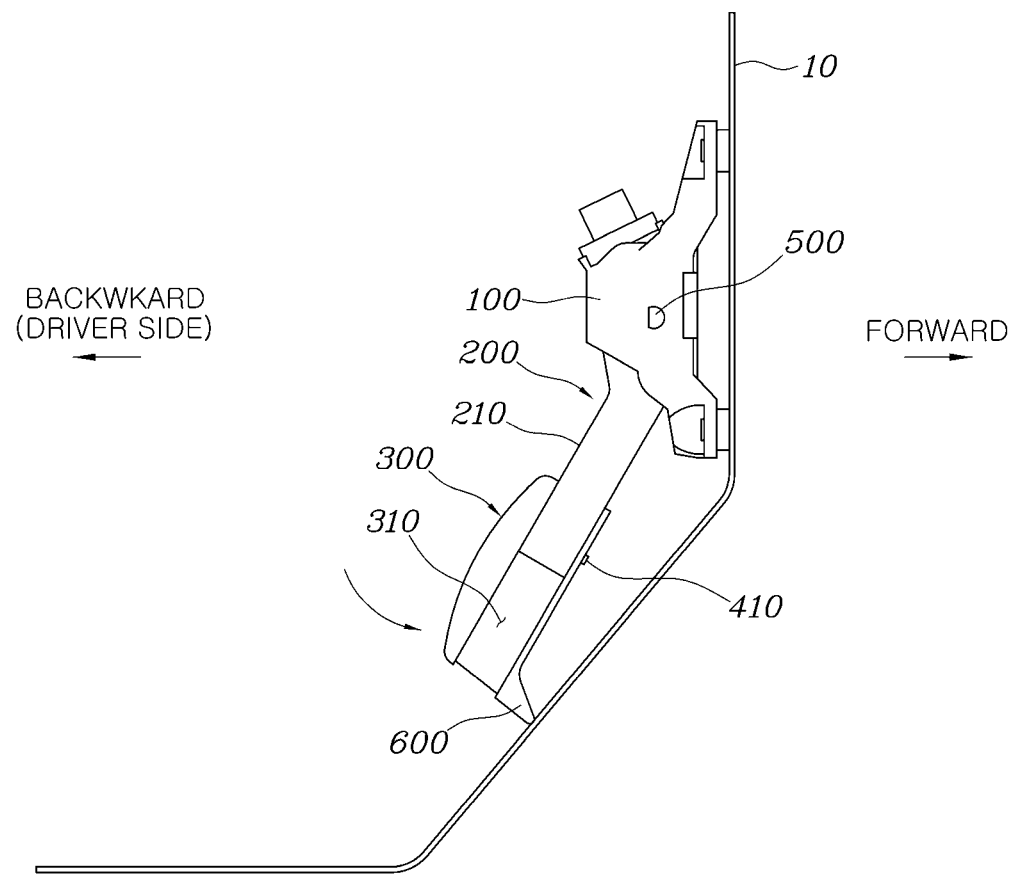
FIG. 6 is a view exemplarily illustrating a normal operation state in which pedal arm is rotated forward by the manipulation of the popped-.p pedal by a driver.

As illustrated in FIG. 2, when the drives steps on the pedal pad 300 for manipulation when the pedal pad 300 is in the pop-up state, the pedal arm 200 rotates forward around the hinge portion 500 and the stopper protrusion 600 comes into contact with the dash panel 10 at the instant time as illustrated in FIG. 6. Accordingly, the full stroke position of the pedal arm 200 is restrained so that the pedal arm 200 stops rotating forward thereof.

As illustrated in FIG. 7, when the pedal pad 300 is in the hide state, the stopper protrusion 600 faces the pedal housing 100 at a minimal interval therebetween.

Accordingly, the contact of the stopper protrusion 600 with the pedal housing 100 stops the pedal arm 200 from rotating forward even when the pedal arm 200 is subjected to a force to rotate forward by an erroneous manipulation of the driver stepping on the pedal pad 300 or by an external impact including an accident while the pedal pad is in the hide state, preventing an accident caused by a faulty operation of the pedal arm 200.

According to an exemplary embodiment of the present disclosure, the pedal pad 300 is provided with an operating space 310 into which the end portion of the pedal arm 200 is inserted to be coupled to the pedal pad 300.

A cross-sectional view of the pedal pad 300 shows that the operating space 310 is formed in a "U" shape, and one side surface and the upper and lower surfaces of the external peripheral surface of the pedal pad 300 are connected to the operating space 310 in an open structure and the other side surface is formed with a blocked portion to be disconnected from the operating space 310.

When the pedal pad 300 rotates by operation of the rotation motor 400, an internal wall surface 321 of the blocked portion 320 of the pedal pad 300 comes into contact with one side surface of the pedal arm 200, and the pedal pad 300 stops rotating at the instant time and turns into either the pop-up state or the hide state.

Figure 5:
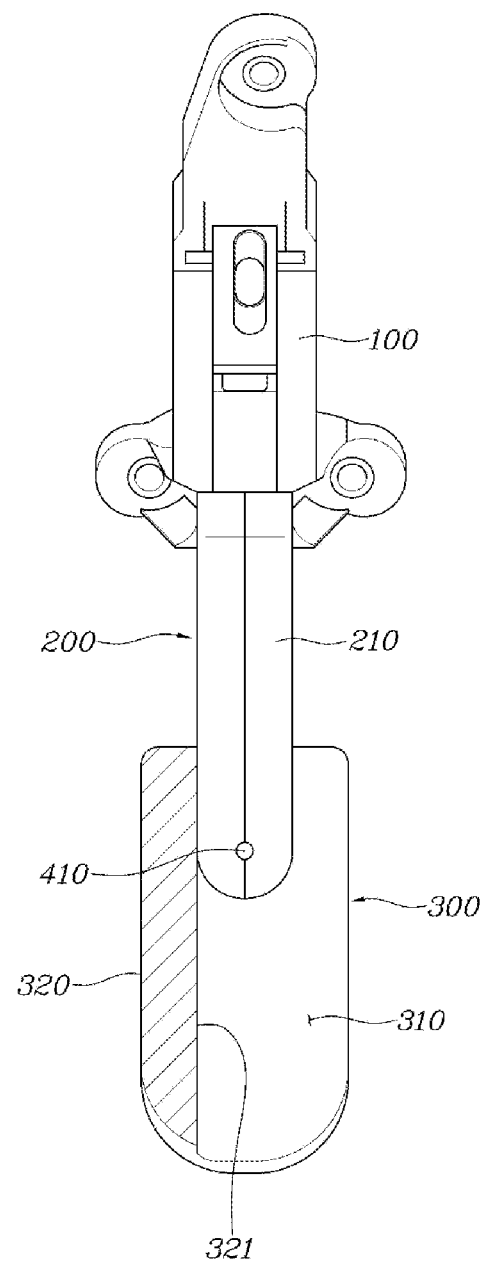
FIG. 5 is a front view of the foldable pedal apparatus in FIG. 3.

That is, when the pedal pad 300 rotates into the pop-up state by operation of the rotation motor 400, the internal wall surface 321 of the blocked portion 320 of the pedal pad 300 comes into contact with the left side surface of the pedal arm 200 as illustrated in FIG. 5, and the pedal pad 300 stops rotating at the instant time so that the pedal pad 300 remains in the pop-up state.

When the pedal pad 300 rotates counterclockwise to shift into the hide state by operation of the rotation motor 400 in the state illustrated in FIG. 5, the internal wall surface 312 of the blocked portion 320 of the pedal pad 300 comes into contact with the right-side surface of the pedal arm 200 as illustrated in FIG. 9. The pedal pad 300 stops rotating at the instant time, and the pedal pad 300 remains in the hide state.

According to an exemplary embodiment of the present disclosure, the pedal arm 200 includes a straight portion 210 protruding from the pedal housing 100, and the straight portion 210 of the pedal arm 200 is inserted into the operating space 310 of the pedal pad 300 when the pedal pad 300 is in the hide state so that pedal pad 300 wraps around a part of the pedal arm 200, and accordingly, the length L2 in the hide state thus shrinks relative to the length L1 in the pop-up state.

According to the exemplary embodiment of the present disclosure, when the pedal housing 100 is fixed on the dash panel 10, the blocked portion 320 of the pedal pad 300 is provided to face the vehicle door while the pedal pad 300 is in the pop-up state so that the opening portion of the operating space 310 of the pedal pad 300 is not visible while the vehicle door is open, improving the appearance of the vehicle.

Figure 10:
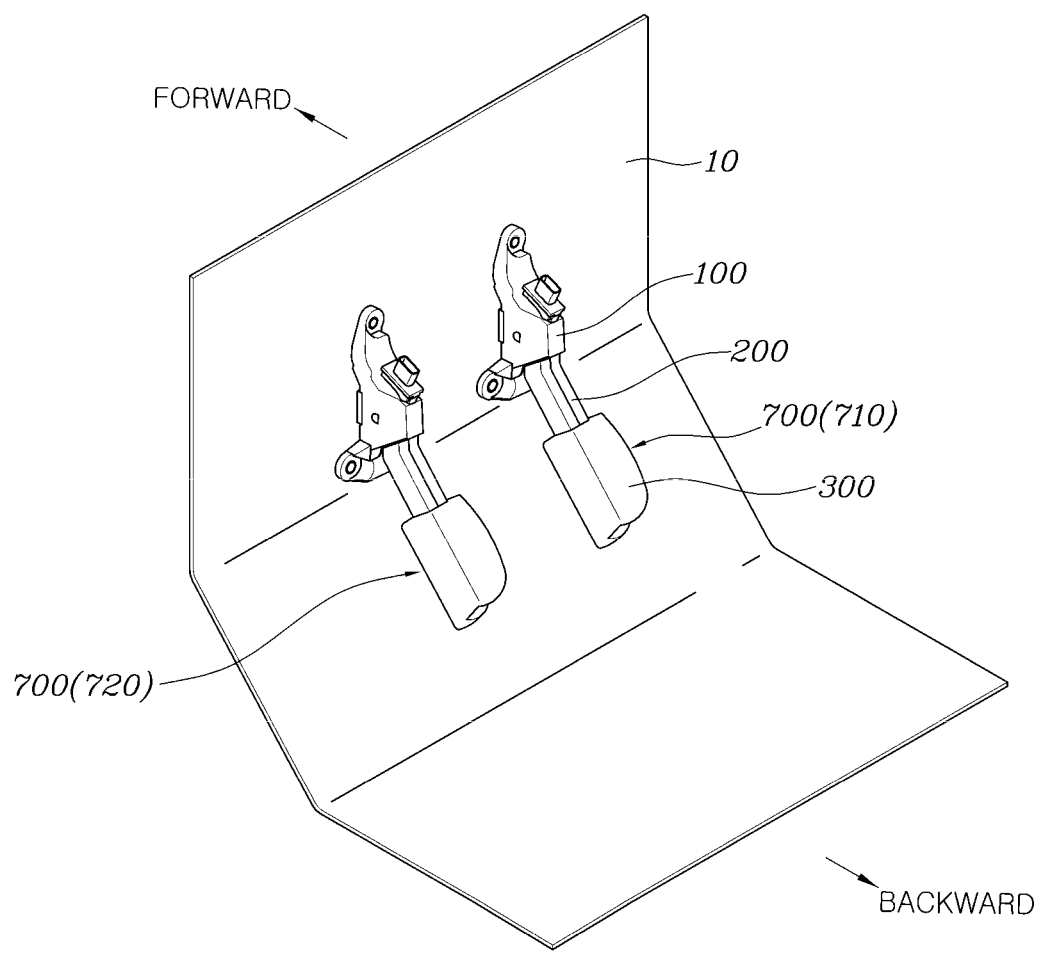
FIG. 10 is a view exemplarily illustrating a foldable pedal apparatus provided right and left on a dash panel according to an exemplary embodiment of the present disclosure.

According to various exemplary embodiments of the present disclosure, as illustrated in FIG. 10, the pedal housing 100, the pedal arm 200, and the pedal pad 300 form a pedal assembly 700, two assemblies 700 are provided, the two assemblies 700 are provided right and left to be spaced from each other on the dash panel 10, and of the two assemblies 700, one is used as an accelerator pedal device 710 and the other is used as a brake pedal device 720.

As described above, according to an exemplary embodiment of the present disclosure, the foldable pedal apparatus has a pendant-type configuration provided with a pedal arm 200 and a pedal pad 300, and the pedal pad 300 pops up to protrude toward the driver or hide to block exposure toward the driver as the pedal pad 300 rotates with respect to the pedal arm 200, allowing comfortable rest of the driver in the autonomous driving mode and further improving safety by blocking a faulty manipulation of a pedal in the autonomous driving mode.

Furthermore, according to an exemplary embodiment of the present disclosure, the foldable pedal apparatus may minimize the length from the hinge portion 500 of the pedal arm 200 to the end portion of the pedal pad 300 when the pedal pad 300 is in the hide state, reducing an overall size of the pedal apparatus and ensuring sufficient free space when the pedal pad 300 is in the hide state.

Furthermore, according to an exemplary embodiment of the present disclosure, the foldable pedal apparatus is a pendant-type apparatus in which the pedal housing 100 is suspended from the dash panel 10 in the lower space of the driver's seat so that the foldable pedal apparatus may be provided and operated without forming a hole in the dash panel 10, stopping the noise and foreign objects from entering the passenger compartment and preventing moisture leak as much as possible.

Furthermore, according to an exemplary embodiment of the present disclosure, the rotation motor 400 rotates the pedal pad 300 only to implement the foldable pedal apparatus so that a low-capacity motor may be used, allowing cost cut and weight reduction.

Furthermore, according to an exemplary embodiment of the present disclosure, the contact of the stopper protrusion 600 with the pedal housing 100 stops the pedal arm 200 from rotating even when the driver manipulates the pedal pad 300 while the pedal pad 300 is in the hide state, preventing an accident resulting from a faulty operation of the pedal arm 200 by effectively blocking the forward rotation of the pedal arm 200 when the pedal pad 300 is in the hide state.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodi-

What is claimed is:

1. A foldable pedal apparatus for a vehicle, the foldable pedal apparatus comprising:
   a pedal housing;
   a pedal arm, a first end portion of which is rotatably coupled to the pedal housing to rotate forwards and backwards; and
   a pedal pad, a first end portion of which is rotatably coupled to a second end portion of the pedal arm,
   wherein the pedal pad turns into a pop-up state in which the pedal pad is manipulated in a manual driving mode as the pedal pad rotates backward and downward with respect to the pedal arm and extends in a longitudinal direction of the pedal arm so as to be exposed toward a driver,
   wherein the pedal pad turns into a hide state in which the pedal pad is not manipulated in an autonomous driving mode as the pedal pad rotates forward and upward with respect to the pedal arm and wraps around a portion of the pedal arm, so as to hide from the driver, and
   wherein the pedal pad is provided with an operating space into which the second end portion of the pedal arm is inserted to be coupled to the pedal pad.

2. The foldable pedal apparatus of claim 1, wherein the pedal pad hides from the driver in the hide state as a length from a hinge portion of the pedal arm to a second end portion of the pedal pad decreases when the pedal pad shifts from the pop-up state to the hide state.

3. The foldable pedal apparatus of claim 1, further including a rotation motor fixed to the second end portion of the pedal arm and configured to rotate the pedal pad clockwise or counterclockwise during operation thereof, a motor shaft being coupled to the rotation motor and the pedal pad.

4. The foldable pedal apparatus of claim 1,
   wherein a second end portion of the pedal pad is provided with a stopper protrusion.

5. The foldable pedal apparatus of claim 4,
   wherein a full stroke position of the pedal arm is restrained as the stopper protrusion comes into contact with a dash panel when the pedal arm rotates forward according to manipulation thereof while the pedal pad is in the pop-up state.

6. The foldable pedal apparatus of claim 1,
   wherein the pedal pad is provided with a stopper protrusion,
   wherein the stopper protrusion faces the pedal housing when the pedal pad is in the hide state, and
   wherein a contact of the stopper protrusion with the pedal housing stops the pedal arm from rotating forward when the pedal arm is subjected to a force to rotate forward while the pedal pad is in the hide state.

7. The foldable pedal apparatus of claim 1,
   wherein a first side surface and upper and lower surfaces of an external peripheral surface of the pedal pad are connected to the operating space in an open structure and a second side surface of the pedal pad is formed with a blocked portion to be disconnected from the operating space.

8. The foldable pedal apparatus of claim 7, wherein the pedal pad stops rotating and turns into the pop-up state or the hide state when an internal wall surface of the blocked portion comes into contact with a side surface of the pedal arm while the pedal pad rotates.

9. The foldable pedal apparatus of claim 7,
   wherein the pedal arm includes a straight portion protruding from the pedal housing, and
   wherein the pedal pad wraps around a portion in the second end portion of the pedal arm as the straight portion of the pedal arm is inserted into the operating space of the pedal pad when the pedal pad is in the hide state.

10. The foldable pedal apparatus of claim 7, wherein the blocked portion is provided to face a vehicle door when the pedal pad is in the pop-up state.

11. The foldable pedal apparatus of claim 1, wherein the pedal housing is fixed on a dash panel in a lower portion of a driver's seat.

12. The foldable pedal apparatus of claim 1, wherein
    two pedal assemblies, each of which includes the pedal housing, the pedal arm, and the pedal pad are provided right and left to be spaced from each other on a dash panel in a lower space of a driver's seat, and
    of the two pedal assemblies, a first one is used as an accelerator pedal device and a second one is used as a brake pedal device.

13. A foldable pedal apparatus for a vehicle, the foldable pedal apparatus comprising:
    a pedal housing;
    a pedal arm, a first end portion of which is rotatably coupled to the pedal housing to rotate forwards and backward; and
    a pedal pad, a first end portion of which is rotatably coupled to a second end portion of the pedal arm,
    wherein the pedal pad turns into a pop-up state in which the pedal pad is manipulated in a manual driving mode as the pedal pad rotates backward and downward with respect to the pedal arm and extends in a longitudinal direction of the pedal arm so as to be exposed toward a driver,
    wherein the pedal pad turns into a hide state in which the pedal pad is not manipulated in an autonomous driving mode as the pedal pad rotates forward and upward with respect to the pedal arm and wraps around a portion of the pedal arm, so as to hide from the driver,
    wherein the pedal pad is provided with a stopper protrusion,
    wherein the stopper protrusion faces the pedal housing when the pedal pad is in the hide state, and
    wherein a contact of the stopper protrusion with the pedal housing stops the pedal arm from rotating forward when the pedal arm is subjected to a force to rotate forward while the pedal pad is in the hide state.

* * * * *